United States Patent [19]

Kelly

[11] 4,403,111

[45] Sep. 6, 1983

[54] APPARATUS FOR INTERCONNECTING DATA COMMUNICATION EQUIPMENT AND DATA TERMINAL EQUIPMENT

[75] Inventor: Bruce Kelly, Weimar, Calif.

[73] Assignee: ICOT Corporation, Mountain View, Calif.

[21] Appl. No.: 283,415

[22] Filed: Jul. 15, 1981

[51] Int. Cl.³ .................... H04L 25/02; H04M 1/74; H04M 3/06
[52] U.S. Cl. .................. 178/69 R; 178/63 R; 179/1 PC; 179/2 DP; 339/156 R
[58] Field of Search ............... 178/69 R, 69 C, 63 R; 179/1 PC, 2 C, 2 DP; 375/36; 339/154, 156, 28, 29; 307/147, 148

[56] References Cited

PUBLICATIONS

Specification Sheet GDS 232 Monitor, Goodwood Data Systems, 11-30-77, 2 pages.
IEEE Interface Bus Cable, Design Information and price, 1 page.

*Primary Examiner*—Stafford D. Schreyer
*Attorney, Agent, or Firm*—Townsend & Townsend

[57] ABSTRACT

An interface for connecting data terminal equipment (DTE) to data communication equipment (DCE) is provided which requires no modification to an existing and widely accepted DCE connector and yet which permits data communication according to more recently adopted functional interface standards through the same DCE connector. Specifically, in a single 25-position interconnection configuration for DTE, an interface is provided which supports (1) the EIA Standard RS-232C interface with unbalanced generators and receivers at generally established RS-232C pin assignments at a DCE terminal junction; (2) an RS-449-type interface with balanced generators and receivers with pin assignments at locations incapable of being confused with RS-232C interface connections at a DCE terminal junction; and (3) an RS-449-like interface with balanced generators and receivers in a variety of multiple-point applications. The DTE portion of the interconnection according to the invention includes only an external cable and connector which is provided to the DCE terminal junction. In an RS-232C interconnection, the external cable includes connections jumpering to ground one input of each balanced receiver to allow use of the receiver as an unbalanced RS-232C-type receiver. In both balanced and unbalanced configurations, the cabling to the DCE includes the minimum number of electrical conduits necessary for DTE communication.

13 Claims, 7 Drawing Figures

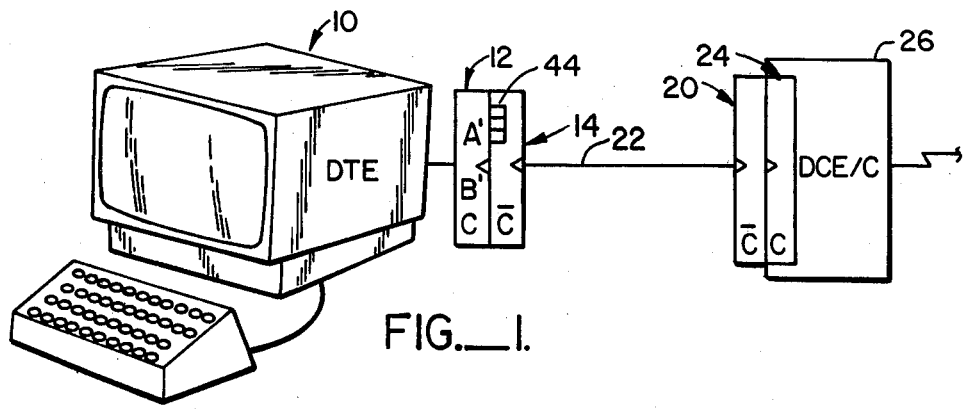
FIG._1.
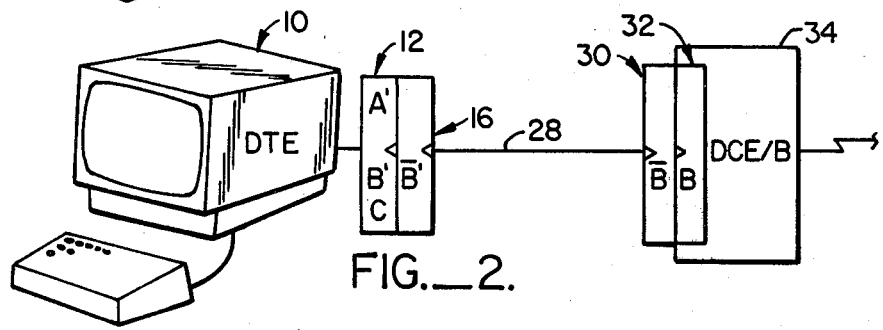
FIG._2.
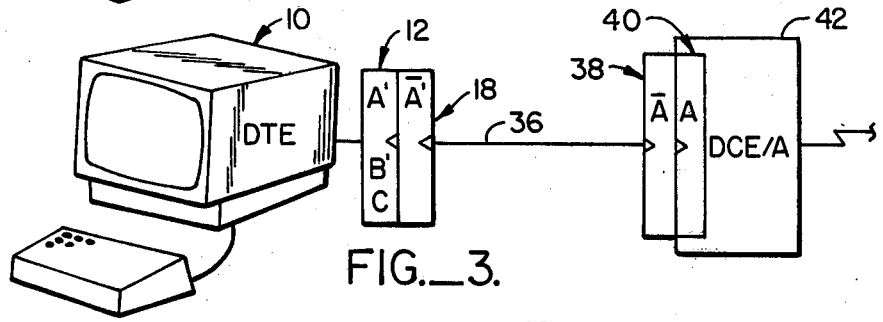
FIG._3.
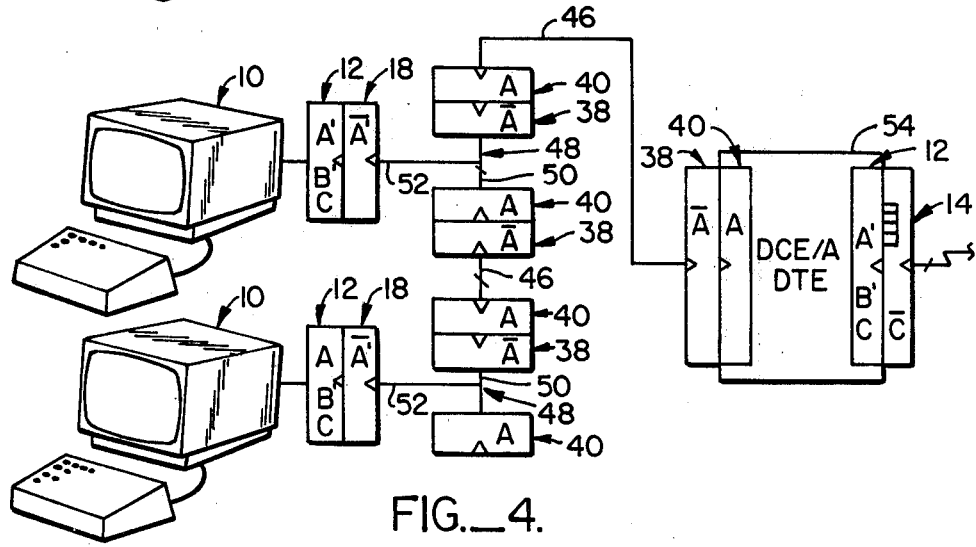
FIG._4.

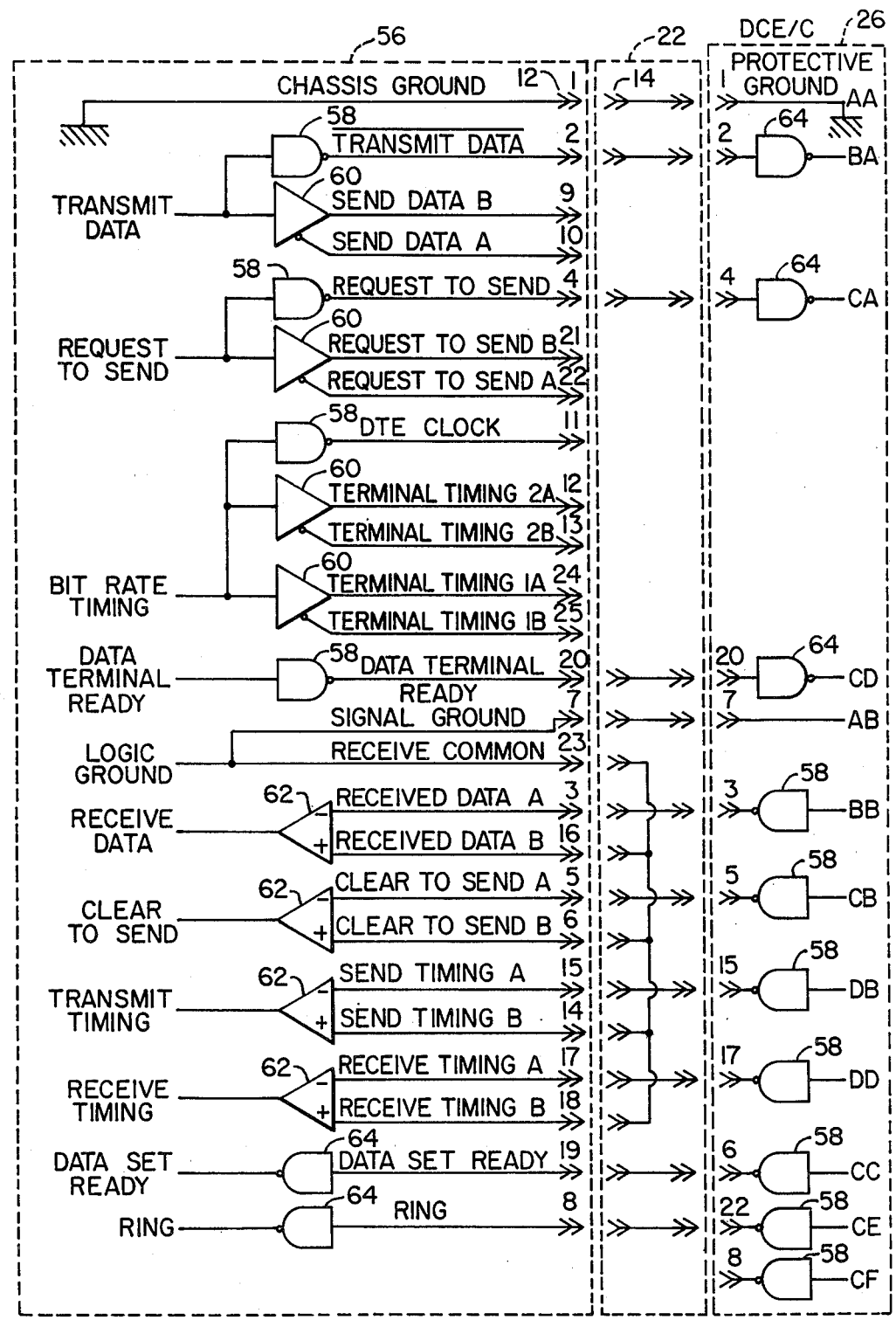
FIG._5.

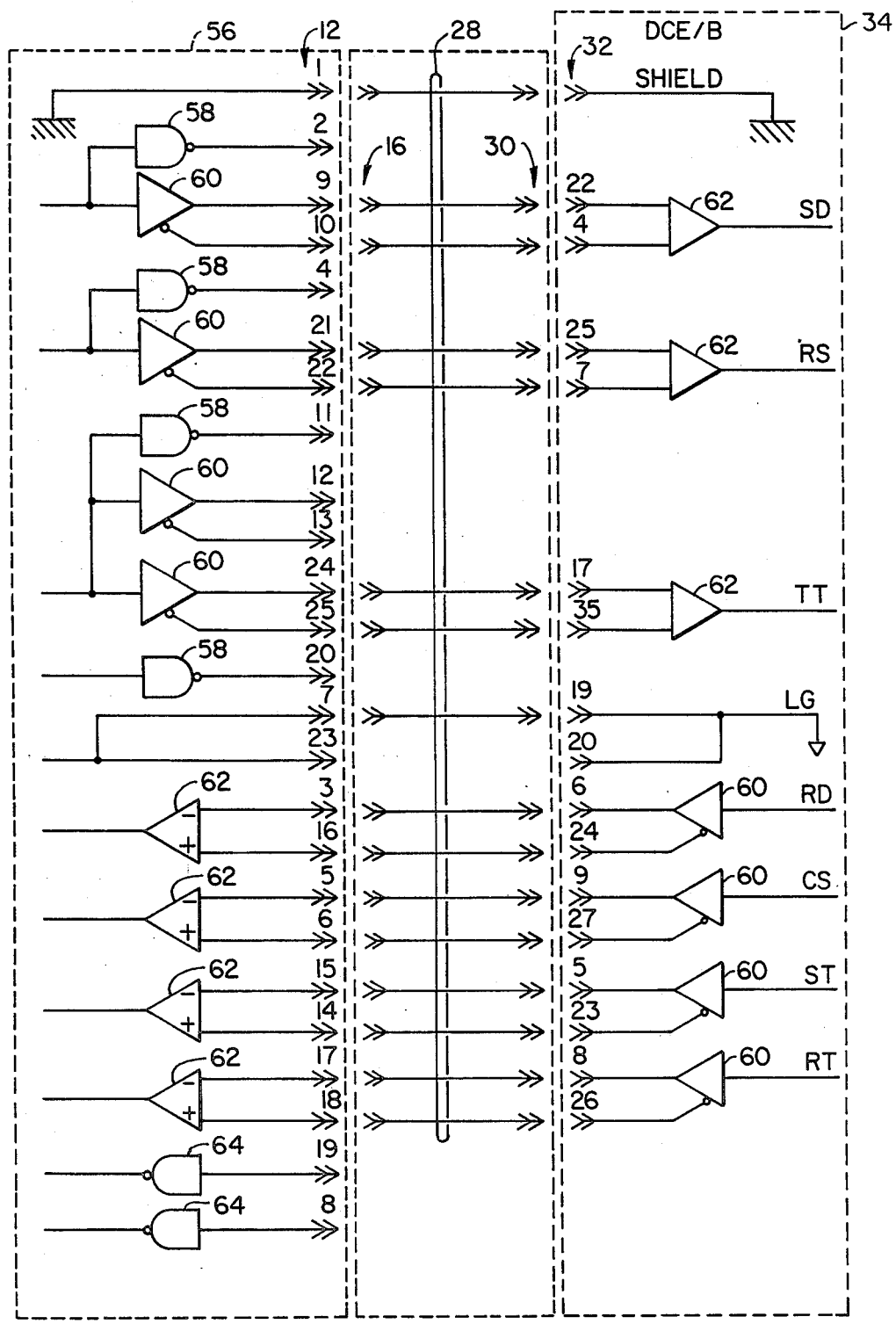
FIG._6.

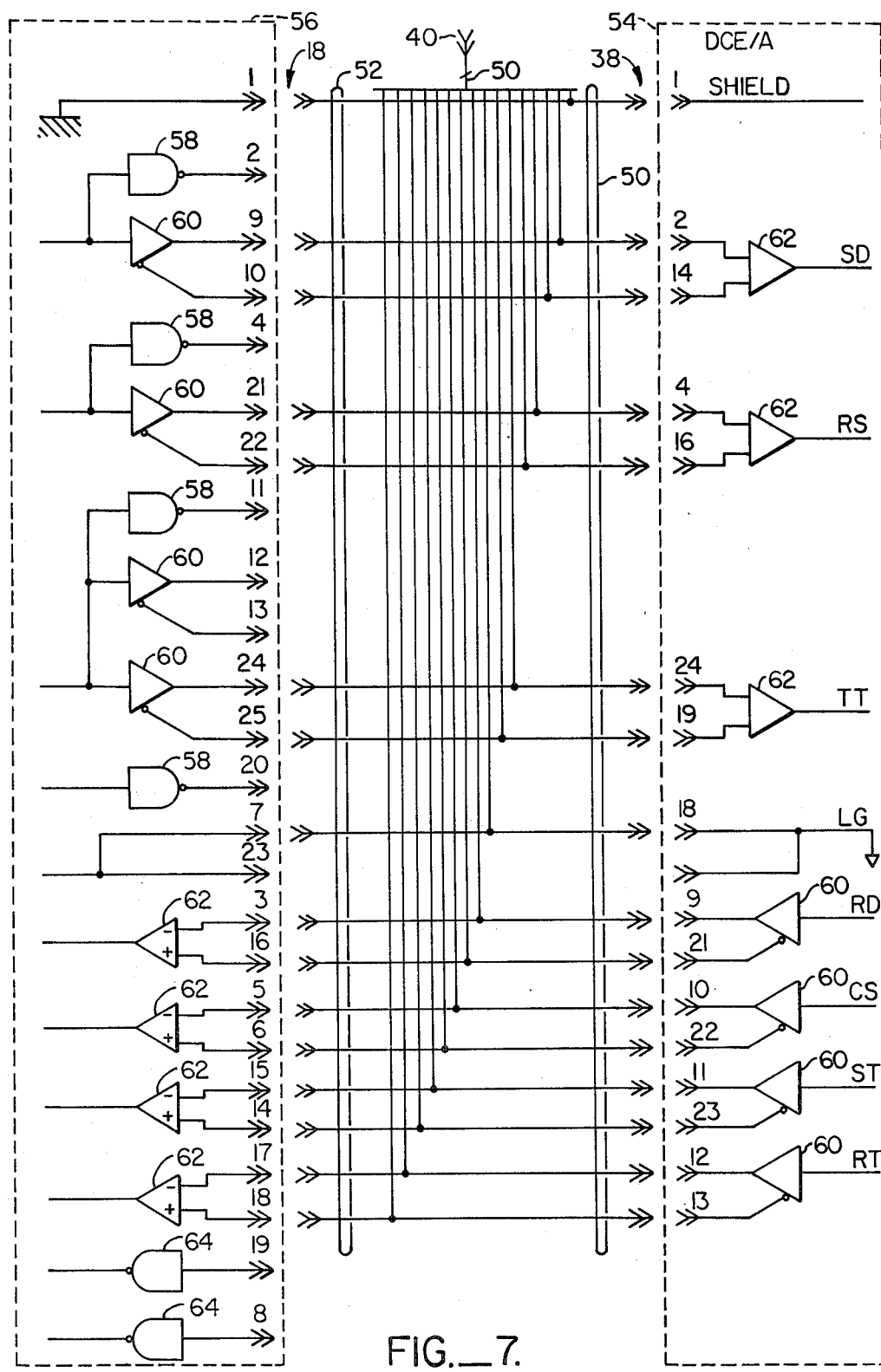
FIG._7.

APPARATUS FOR INTERCONNECTING DATA COMMUNICATION EQUIPMENT AND DATA TERMINAL EQUIPMENT

BACKGROUND OF THE INVENTION

1. Field of Invention

This invention relates to interface apparatus between data terminal equipment (DTE), such as keyboards, printers, I/O devices and the like, and data communication equipment (DCE), such as modulator/demodulators (modems). More specifically, this application relates to apparatus for interconnecting data terminal equipment with data communication equipment which interface according to the provisions of both EIA standard RS-232C and EIA Standard RS-449 employing balanced voltage digital interface circuits according to EIA electrical Standard RS-422.

The Electronic Industries Association (EIA) has provided engineering standards designed to facilitate interchangeability of equipment for transmission of digital data. For many years, the industry standard of interface between DTE and DCE has been the provisions of EIA standard RS-232C. Standard RS-232C specifies both electrical characteristics and physical characteristics, including protocol, for digital data interchange. RS-232C specifies a 25-position basic mechanical connection between a DTE and DEC. In addition, RS-232C specifies the transmission and reception of data by means of unbalanced voltage digital interface generators and receivers of defined electrical characteristics.

It was the intent of EIA Standard RS-232C that it be applicable to data transmission speeds up to about 20,000 symbols per second over relatively short cable lengths between a single modulator/demodulator (modem) and a single terminal device. The characteristics of the RS-232C electrical interface are not suitable for handling data and timing signals in the megabit range due, for example, to increased crosstalk between the normally unbalanced circuits and due to the reflections caused by the typical lack of matched impedance terminations in the simple wire conduit interchange circuits.

EIA Standard RS-449 specifies functional characteristics through a 37-position mechanical interconnection capable of providing multiple-point (multi-drop) interconnection through a single cable. The RS-449 standard is designated to employ two types of electrical characteristics, namely, RS-422, specifying balanced differential voltage digital interface circuits, and RS-423, specifying an unbalanced voltage digital interface circuits. These interface standards may be referred to herein as RS-449/422 and RS-449/423.

In order to obtain maximum data rates and maximum distance of data transmission without undue distortion, the use of a balanced data communication line has been recommended. One of the reasons for this recommendation is the characteristic of common mode noise rejection found only in a balanced line. As a consequence, an interface using 24-gauge twisted pair cable interconnection circuit according to RS-422 electrical standards is capable of transmitting data through cable lengths of 4,000 feet at rates up to 100,000 symbols per second, and further is capable of transmitting data over cables of 50 feet long at rates up to about 7.5 million symbols per second. In addition, both RS-422 and RS-423 are intended to support multiple-terminal (multipoint) operation of DEC and DTE.

Since the recommended adoption of the RS-449 37-position interface for DTE and DCE in November 1977, there has been considerable resistance to the adoption of the 37-pin connection standard. It has been found, for example, that most of the 37 lines are not needed by the DTE. Moreover, it has been found that the cost of cabling a full 37-position line may often exceed the cost of the equipment itself. For example, a cable 4,000 feet long may cost as much as four times the cost of the equipment to which it is connected, at current material prices. Hence, data communication equipment manufacturers especially have been reluctant to incorporate a 37-pin connector RS-449 interface into modem equipment used to communicate with communication lines, such as telephone lines. Nevertheless, the RS-449/422 electrical standard represents a substantial advance in the rate capacity and versatility of interface circuits. What is needed therefore is data terminal equipment and data communication equipment interface circuitry which is capable of communication with both RS-232C standard interface circuitry and a subset of RS-449-type interface circuitry taking full advantage of the RS-422 electrical standard to permit successful integration of advanced high-speed equipment into communication systems in a manner which is compatible with industry-wide standards.

2. Description of the Prior Art

Industrial Electronics Bulletin No. 12 dated November 1977 entitled, "Application Notes on Interconnection Between Interface Circuits Using RS-449 and RS-232-C" published by the Electronic Industries Association suggests the current accepted method and apparatus for interconnecting RS-232C-type DTE to RS-449-type DCE as well as for interconnecting RS-449-type DTE to RS-232C-type DEC. This Bulletin is intended to specify all necessary electrical, function and mechanical consideration necessary for satisfactory operation between RS-232C-type equipment and RS-449-type equipment. Basically, the Bulletin suggests that RS-449-type equipment be derated to operate in the RS-232C environment using RS-423 electrical characteristics adapted to the particular application. Since RS-423 electrical characteristics specify unbalanced circuits, near equivalency can be obtained for interoperability by placing an attenuator pad between an RS-232C generator and RS-422 receiver. RS-422-type receivers are converted to unbalanced connectors by grounding one side of the receiver input.

The Bulletin further suggests the use of external or in-cable 25- to 37-pin adapters for interconnection configurations. Moreover, the Bulletin suggests the use of different connectors for RS-449 as an advantage for preventing inadvertent connection of RS-449 equipment to RS-232C equipment. The larger 37-position connector as well as a supplemental 9-position connector specified in the RS-449 standard have nevertheless found little acceptance since it adversely affects both the price and the reliability of the host equipment. What is needed is a connection which will enable the interoperability of both RS-232C-type equipment and RS-449/422-type equipment in a smaller, i.e., 25-position connector. In this manner, RS-232C DCE can be connected to RS-449 or RS-232C-type DTE, and the inconvenient external adapter can be eliminated. The supplier of DTE may therefore provide both the terminal equipment and the cabling for connection with the DTE provided by a modem manufacturer or supplier. The DCE supplier may therefore rest assured that the equipment can be made to neet the needs of both existing equipment users and future equipment users.

SUMMARY OF THE INVENTION

According to the invention, an interface for connecting data terminal equipment (DTE) to data communication equipment (DCE) is provided which requires no modification to an existing and widely accepted DCE connector and yet which permits data communication according to more recently adopted functional interface standards through the same DCE connector. Specifically, in a single 25-position interconnection configuration for DTE, an interface is provided which supports (1) the EIA Standard RS-232C interface with unbalanced generators and receivers at generally established RS-232C pin assignments at a DCE terminal junction; (2) an RS-449-type interface with balanced generators and receivers with pin assignments at locations incapable of being confused with RS-232C interface connections at a DCE terminal junction; and (3) an RS-449-like interface with balanced generators and receivers in a variety of multiple-point applications. The DTE portion of the interconnection according to the invention includes only an external cable and connector which is provided to the DCE terminal junction. In an RS-232C interconnection, the external cable includes connections jumpering to ground one input of each balanced receiver to allow use of the receiver as an unbalanced RS-232C-type receiver. In both balanced and unbalanced configurations, the cabling to the DCE includes the minimum number of electrical conduits necessary for DTE communication.

Internal to the DTE interconnection, each outgoing signal line is coupled both to an RS-232C-type single output (unbalanced) signal transmission generator and to an RS-449/422-type dual output (balanced) signal transmission generator, all of whose outputs are connected to unique positions in a 25-position back plane connector. The pin assignments of the cable connector at the DCE terminal establish compatibility with the DCE.

One of the advantages of the present invention is the elimination of expensive and unnecessary cabling by providing interface circuits with the minimum required number of conduits.

Another advantage of the present invention is the provision of an interface circuit for data terminal equipment capable of communicating with both RS-232C and RS-449/422-type data communication equipment without modification to the terminal junction of the data terminal equipment.

A still further advantage of the invention is the provision of RS-422 balanced interface circuits within a 25-position interconnection which is also capable of communicating with RS-232C-type communication equipment, thereby eliminating the need for multiple-terminal junctions in data terminal equipment.

A still further advantage of the invention is the provision of RS-422-type balance interconnections in a standard interface permitting extremely long cable lengths with multiple junctions in a multiple-point or multi-drop configuration.

A still further advantage of the invention is the adaptability of the interface connection for use in conjunction with intermediate data concentrating equipment between data terminal equipment and data communication equipment, thereby to take full advantage of the data communication capacity of the communication link.

A particular advantage of this invention is the ability to connect data terminal equipment having a standard pin assignment through a selection of different cables directly to data communication equipment having, respectively: (a) 37-position standardized RS-449 pin assignments where not all pins are required; or (b) 25-position standardized RS-232C pin assignments; or (c) a 25-position DCE interconnection corresponding with the 25-position DTE interconnection (herein called an ICO INTERFACE). This versatility of interconnection is defined by the pin assignments within three different types of cables providing the electrical communication between the interconnectors.

These advantages will be apparent upon reference to the following detailed description taken in connection with the accompanying drawings.

BRIEF DESCRIPTION OF THE DRAWINGS

FIG. 1 is a block diagram of a type RS-232C interface between DTE and DCE.

FIG. 2 is a block diagram of one type of RS-449 interface between DTE and DCE.

FIG. 3 is a block diagram of one type of interface between DTE and DCE employing 25-pin connectors and supporting type RS-422 transmitters and receivers.

FIG. 4 is a block diagram of a second type of interface between several DTE and DCE employing 25-pin connectors and supporting type RS-422 transmitters and receivers.

FIG. 5 is a schematic diagram of the interconnect shown in FIG. 1.

FIG. 6 is a schematic diagram of the interconnect shown in FIG. 2.

FIG. 7 is a schematic diagram of the interconnect shown in FIG. 4 and by extension also FIG. 3.

DETAILED DESCRIPTION OF SPECIFIC EMBODIMENTS

Referring to FIGS. 1-4, there are shown three different configurations for interconnecting data terminal equipment (DTE) and data communication equipment (DCE) (in FIGS. 1-3) and a configuration for interconnection between various DTE (FIG. 4). In each configuration, there is a DTE 10, which may include a display unit and keyboard, generally referred to as a terminal, or a printer (not shown). Each DTE 10 according to the invention includes a 25-pin panel connector 12 on its back panel.

According to the invention, the panel connector 12 is capable of electrically and mechanically interlocking with three different complementary cable connectors 14 (FIG. 1), 16 (FIG. 2) or 18 (FIGS. 3 and 4) whose distinction lies in the internal electrical wiring of the connector rather than in the mechanical connection. The first type cable connector 14 is coupled to a fourth type cable connector 20 through a first specific cable 22 whose number of conduits is chosen to reflect the type of DCE to DTE interface. The fourth type cable connector 20 is adapted to interconnect with a complementary 25-pin panel connector 24 of a standardized type. According to the invention, panel connector 24 is of the EIA Standard RS-232C-type with specified electrical and mechanical characteristics for DCE. Hence, panel connector 24 is referred to herein as a C-type panel connector and the DCE associated therewith is designated herein as DCE/C 26.

In a similar manner, a second type cable 28 provides connection from second type cable connector 16 to fifth type cable connector 30, connector 30 being adapted to connect to a panel connector 32 which is complementary to fifth type cable connector 30. Panel connector 32 may be of the 37-pin EIA Standard RS-449-type designated herein as type B. Hence, the B panel connector 32 is the interface connection of DCE/B 34.

EIA Standard RS-449-type connectors may have internal electrical connections which are not necessarily useable with a DTE 10 of the type herein contemplated. Since the capabilities of the system is a limitation of the DTE 10, superfluous connections through the B panel connector 32 are of no consequence. Moreover, the demarcation between DTE and DCE is generally at the interconnection between the DCE panel connector and its complementary cable connector, the cable, cable connectors and DTE being considered integral with the terminal equipment supplied for data communication.

FIG. 3 depicts a still further configuration of the interconnection between DTE 10 and a specific type of DCE 42. In FIG. 3, the third type cable connector 18 is coupled through a third cable 36 to a sixth type cable connector 38. The sixth type cable connector 38 is adapted to be connected to a complementary panel connector, herein designated the A panel connector 40. The A panel connector 40 is the panel connector for an interface unit of a third data communication equipment herein designated DCE/A 42. It refers to a particular type of 25-pin interconnect scheme developed by ICOT Corporation of Mountain View, California. The configuration, hereinafter designated the ICO INTERFACE is a type of interface configuration which according to the invention permits particular types of terminals, e.g., DTE 10 manufactured by ICOT, to interface with either RS-232C DCE such as DCE/C 26, or with 37-pin RS-449-type interface equipment such as DCE/B 34, or with the ICO INTERFACE, and to do so through a single 25-pin panel connector 12.

In order to indicate the exact type of pin configuration and its related complement, letter designations are used in connection with each panel connector and cable connector. For example, as already noted, panel connectors 24, 32 and 40 have been designated, respectively, panel connector $\overline{C}$, panel connector $\overline{B}$, and panel connector $\overline{A}$. The complementary cable connectors 20, 30 and 38 may therefore be designated cable connector C, cable connector B, and cable connector A, respectively.

Referring particular to FIG. 1, it will be seen that cable connector 14 is also designated cable connector C. However, in addition, there is shown a bridge interconnect 44 within the cable connector 14, designating that selected pins of the cable connector 14 are electrically common. According to the invention, these electrically common terminals are operative to convert certain circuitry within the interface circuitry of the DTE 10 from balanced type to unbalanced type, allowing the DTE 10 to be used in an unbalanced signal communication mode. The exact designation of the pins connected in common in bridge in bridge interconnect 44 is given in Table I, hereinafter explained.

Referring to FIG. 2, the second type cable connector 16 is designated cable connector B', the prime (') indicating that the pin assignments differ from the pin assignments of the related cable connector 30, the cable connector 30 being designated as cable connector B. Referring to FIG. 3, cable connector 18 is also referred to as cable connector A', thereby also designating that the pin assignments thereof differ from the related cable connector 38, herein designated cable connector $\overline{A}'$. Referring to DTE 10 of FIGS. 1-3, it will be seen that the first panel connector 12 has three designations, namely, A', B' and C. These three designations indicate the types of cables to which this cable connector may be connected. According to the invention, three types of cables can be connected to panel connector 12 without modification to the panel connector 12 and without modification to the DCE panel connectors 24, 32 or 40, to which they may be connected through a selected cable such as type 1 cable 22, type 2 cable 28, and type 3 cable 36. In summary, any mating cable may be connected to any panel having a matching letter designation if it is the mechanical complement thereof. For example, a C-type connector may designated a female connector and a $\overline{C}$-type connector may designate a male-type connector and so forth.

Two other types of cables have been developed for use with the ICO INTERFACE or $\overline{A}$ type connector 40, namely a feed cable 46 and drop cable 48. Each feed cable 46 has a type $\overline{A}$ cable connector 38 on the DCE end and a type A connector 40 on the DTE end. Each drop cable 48 comprises a feed line 50 and drop line 52. On the DTE end of the feed line 50 is a type $\overline{A}$ cable connector 38 and on the DCE end is a type A cable connector 40, i.e., a connector of the same mechanical type as is used for a panel connector 40 but incorporated in a cable. The DCE end of the drop line 52 is however a type $\overline{A}'$ cable connector 18. All cables and connectors have now been specified which may be used in conjunction with the coupling of a DTE 10 according to the invention to a variety of DCE. In addition, DCE and DTE intermediate equipment as for example a data concentrator 54 or the like (FIG. 4) may employ such cables. A data concentrator 54 may have a further outlet such as a type DTE connector 12 which interconnects with a type C cable connector 14, as one example.

Table I in connection with FIGS. 5-7 provides details of specific embodiments according to the invention. In Table I there are shown pin assignments for the various types of DCE cable and panel connector pairs 20, 24; 30, 32; and 38, 40 and the DTE cable and panel connector pairs 14, 12; 16, 12; and 18, 12 according to the invention. The DTE cable and panel connector pair 12, 14 consists of a 25-pin connector and cable with pin assignments essentially matching the pin assignments of the type RS-232C interface. A cable with eleven or twelve conduits is required to connect the C portion of the DTE interconnection circuit corresponding to the pin assignments. There are, however, unassigned pins, and a reassignment of pin 6 of the Standard RS-232C pin assignment to pin 19 of the DTE panel connector. In addition, pins 23, 16, 6, 14 and 18 of the DTE/C cable connector 14 are coupled to ground, these terminals in the DTE cable connector 12 being coupled to one end of a balanced receiver (FIG. 5), as hereinafter explained. This grounding arrangement converts balanced receivers to unbalanced receivers which are compatible with RS-232C signal interchange standarization.

Referring to FIG. 5, there is shown the interface circuitry supporting the DTE connector 12 according to the invention.

TABLE I

| DTE Function | ICOT DTE Interconnect Pin Assignment (25-position) DTE(A',B',C) | ICOT/422 DCE Interconnect Pin Assignment (25-position) DCE/A | RS-449/422 DCE Interconnect Pin Assign/Label (37-position) DCE/B | RS-232C DCE Interconnect Pin Assign/Label (25-position) DCE/C |
|---|---|---|---|---|
| Chassis Ground | 1 | 1/SHIELD | 1/SHIELD | 1/AA |
|  | 2 |  |  | 2/BA |
| Transmit Data | 9 | 2 ⎱ SD | 22 ⎱ SD |  |
|  | 10 | 14 ⎰ | 4 ⎰ |  |
|  | 4 |  |  | 4/CA |
| Request to Send | 21 | 4 ⎱ RS | 25 ⎱ RS |  |
|  | 22 | 16 ⎰ | 7 ⎰ |  |
|  | 11 |  |  |  |
|  | 12 |  |  |  |
| Bit Rate Timing | 13 |  |  |  |
|  | 24 | 24 ⎱ TT | 17 ⎱ TT |  |
|  | 25 | 19 ⎰ | 35 ⎰ |  |
| Data Term. Ready | 20 |  |  | 20/CD |
|  | 7 |  |  | 7/AB |
| Logic Ground |  |  |  |  |
|  | 23 |  |  | * |
|  | 3 | 9 ⎱ RD | 6 ⎱ RD | 3/BB |
| Received Data | 16 | 21 ⎰ | 24 ⎰ | * |
|  | 5 | 10 ⎱ CS | 9 ⎱ CS | 5/CB |
| Clear to Send | 6 | 22 ⎰ | 27 ⎰ | * |
|  | 15 | 11 ⎱ ST | 5 ⎱ ST | 15/DB |
| Transmit Timing | 14 | 23 ⎰ | 23 ⎰ | * |
|  | 17 | 12 ⎱ RT | 8 ⎱ RT | 17/DD |
| Receive Timing | 18 | 13 ⎰ | 26 ⎰ | * |
| Data Set Ready | 19 |  |  | 6/CC |
| Ring | 8 |  |  | 22/CE |
| Optional Assignments |  |  |  |  |
| Terminal Ready | 20 |  | 12 ⎱ TR | 20/ |
|  | — |  | 30** ⎰ | — |
| (Dummy OFF) | 23 | 18*/RC | 20# ⎱ RC | — |
|  | 7 |  | (19) ⎰ | — |
| (Dummy Generator) | — | (25##) | (37##) | — |

NOTES TO TABLE I:
*Logic ground through pin 7 at DTE cable connector
**Connected to logic ground whenever adjacent pin 12 in use
Connected to logic ground and paired with pin 7 for Dummy OFF source for any DCE receiver not in use
Connected to +5VDC for Dummy ON source for any DCE receiver not in use The interface circuitry hereinafter referred to as the DTE interface circuit 56, comprises type RS-232C generators 58, type RS-422 generators 60, type RS-422 receivers 62 and type RS-232C receivers 64. The circuitry of the generators and receivers 58, 60, 62 and 64 are well-known in the art and have been specified elsewhere. Basically, type RS-232C generators 58 are inverters, type RS-422 generators 60 are balanced output drivers, type RS-422 receivers are balanced input receivers, and type RS-432 receivers 64 are unbalanced input inverting receivers.

Referring now to FIGS. 6 and 7 in connection with FIG 5 and Column 1 of Table I, the DTE interface circuit 56 is shown in specific detail. In particular, pin 1 is assigned to Chassis Ground. Pin 2 is assigned to Transmit Data from a type RS-232C generator 58, pins 9 and 10 are assigned to Send Data from the balanced output of a type RS-422 generator 60, the input of generator 58 and 60 being a common transmit data line from the terminal device 10.

Pin 4 is assigned as a Request To Send line output of a type RS-232C generator 58, with pins 21 and 22 being the balanced-output Request To Send signals from a type RS-422 generator 60, the input of which is common to the input of the Request To Send generator 58 at pin 4. A Request To Send signal is supplied by the terminal device 10. Bit rate timing of the terminal is provided to three generators, a type RS-232C generator 58 whose output is a DTE Clock assigned to pin 11, a type RS-422 generator 60 whose balanced output is assigned as Terminal Timing 1A and 1B to pins 24 and 25 and to a similar RS-422-type generator 60 whose balanced outputs are terminal timing 2A and 2B assigned to pins 12 and 13.

A Data Terminal Ready signal from the terminal device 10 supplied through a type RS-232C generator 58 to a Data Terminal Ready pin 20. A Logic Ground is applied to pin 7 as a Signal Ground and pin 23 as a Receive Common. Pins 3 and 16 are for balanced or unbalanced Receive Data Inputs for a type RS-422 balanced receiver 62 whose output is a Receive Data line to the terminal device 10. Similarly, pins 5 and 6 are for balanced or unbalanced Clear To Send input signals to a type RS-422 receiver 62 for providing a Clear To Send signal to the terminal device 10. Pins 14 and 15 are balanced or unbalanced Send Timing signals to a type RS-422 receiver 62 for providing Transmit Timing to the terminal device 10. Pins 17 and 18 provide balanced or unbalanced input to a type RS-422 receiver for providing Receive Timing to the terminal device 10.

Pin 19 is provided through a type RS-232C receiver 64 for conveying a Data Set Ready signal to the terminal device 10. Finally, pin 8 is connected through a type RS-232C receiver 64 for conveying a Ring signal to the terminal device 10.

Referring now to Table I, Column 4, in connection with FIG. 5, a DCE/C pin assignment for a panel connector interface 24 consists solely of types RS-232C receivers 64, RS-232C transmitters 58 and ground wires. Specifically, pin 1 is Protective Ground AA, pin 2 is a receiver for Transmitted Data BA, pin 4 is a receiver for Request To Send CA, pin 20 is a receiver for Data Terminal Ready CD, pin 7 is Signal Ground AB, pin 3 is a transmitter for Received Data BB, pin 5 is a transmitter for Clear To Send CB, pin 15 is a transmitter for Transmission Signal Element Timing DB, pin 17 is a transmitter for Receiver Signal Element Timing DD, pin 6 is a transmitter for Data Set Ready CC, pin 22 is a transmitter for Ring Indicator CE, and pin 8 is a transmitter for a Received Line Signal Detector CF.

The cable 22 (FIG. 5) provides direct one-for-one pin assignments at pins 1, 2, 4, 7, 3, 5, 15, 17, and 20. Pin 8 has an input provided from pin 22 of the DCE/C panel connector. Internal to the cable 22, pin 23 of the DTE cable connector (a ground terminal) is bridged to pins 16, 6, 14, and 18 thereby to ground one input terminal of each one of the type RS-422 receivers 62 in the DTE 10.

Referring to FIG. 6, the interconnection of a standard RS-449 interface according to the RS-422 Standard is shown. Only a few of the pin assigments of the standard 37-position device are relevant to the present invention. The invention employs fifteen to twenty conduits in the cable 28 to connect the DTE interface circuit 56 through the DTE terminal connector 12. These conduits provide a balanced connection for transmitting data, requests to send and bit rate timing, and balanced connections for receiving data, clear to send signals, transmit timing, receive timing and a single logic ground interconnect.

The DCE/B panel connector 32 is supported by type RS-422 receivers 62 at pins 22 and 4, 25 and 7, and 17 and 35. The type RS-422 generators 60 support pin pairs 6 and 24, 9 and 27, 5 and 23, and 8 and 26. A signal ground is provided at pin 19. In addition, pins 12 and 30 are supported by a type RS-422 receiver 62, pin 20 is connected to pin 19, and pin 37 may be connected to a positive 5-volt DC source for any DCE receiver employed in the standard interface which is not in use.

Comparing FIG. 6 with Table I, the DCE/B cable 28 is a feed through or drop connector with the following connector pin pairings between the DTE and DCE: 9 to 22, 10 to 4, 21 to 25, 22 to 7, 24 to 17, 25 to 35, 7 to 19, 3 to 6, 16 to 24, 5 to 9, 6 to 27, 15 to 5, 14 to 23, 17 to 8, and 18 to 26. In addition there are optional assignments of DTE to DCE of terminal 20 to 12 with terminals 30 of the DCE/B connected to ground, 23 to 20, 7 to 19, and positive 5-volts DC to 37.

Referring to FIG. 7 in conjunction with Column 2 of Table I the ICOT/422 DCE interconnect pin assignment is shown. The Table shows the pin assignments for the cable 36 of FIG. 3 or the drop line of FIG. 4 to the feed line 50 type cable connectors. The feed line 50 cable connectors have a one-for-one pin assignment, whereas the drop line cable connectors do not. For example, the DTE cable connector 16 has exactly the same pin assignments as the DTE cable connector 18. However, the DCE/B cable connector 30 is disposed for the 37-pin interconnect and the DCE/A cable connector 38 is designated for the 25-pin interconnect. For the 25-pin interconnect, the pin assignment from the DTE cable connector to the DCE/A cable connector is as follows: 1 to 1, 9 to 2, 10 to 14, 21 to 4, 22 to 16, 24 to 24, 25 to 19, 3 to 9, 16 to 21, 5 to 10, 6 to 22, 15 to 11, 14 to 23, 17 to 12, and 18 to 13. There are optional connections from the DTE pin 23 to the DCE 18 which is for a logic ground through pin 7 at the DTE cable connector. In addition, a dummy generator may be provided at pin 25 with a positive 5-volt DC value for a dummy ON source for any DCE receiver not in use.

The distinguishing feature of the invention is readily defined by the designation of the unassigned pin assignments of the DCE interface. For example, in connection with a DTE interconnect, an EIA Standard RS-449/422 37-position interface should specifically provide unassigned pin assigments at pins 2, 3, 10, 11, 13, 14, 15, 16, 18, 21, 28, 29, 31, 32, 33, 34 and 36. In addition, if optional features are deleted, the further unassigned pin assignments may be at pins 12, 19, 20, 30 and 37.

In a type RS-232C system, where there is a one-for-one pin correspondence between the DTE and DCE, the following are required unassigned pin assignments: 10, 11, 12, 13, 19, 21, 24 and 25. These pin assignments are reserved for interface with the other types of cable connectors and DCE. Of course, to function properly, a signal ground must be applied through the cable at pin assignments of 6, 14, 16, 18 and 23.

The invention has now been explained with reference to specific embodiments. Other embodiments will be apparent to those of ordinary skill in view of this specification. For example, other pin assignments may fall within the scope of the claims which are compatible with the various pin assignments herein enumerated. A specific example is the provision of a 37-pin type DCE, such as DCE/B 34, with a connector cable having a B type 37-pin cable connector at the DCE end and an A type 25-pin cable connector at the DTE end. Thus the RS-449/422 standard interface may be coupled with an ICO INTERFACE in a manner which provides transparent communication between an ICOT type 25-pin DTE and a DCE according to the established 37-pin standard. It is therefore not intended that the invention be limited except as indicated by the appended claims.

What is claimed is:

1. An apparatus for interconnecting data terminal equipment (DTE) to data communication equipment (DCE), wherein a multiple terminal electrical connector is mounted to said DCE (herein designated second mounted connector) and wherein means (designated second coupling means) are incorporated in said DCE for coupling specified digital input and output signals between a selected terminal set (herein designated second terminal set) of said second mounted connector and said DCE as standardized transmission and reception signals (herein designated second signals), said apparatus comprising:

a first multiple terminal electrical connector mounted to said DTE;

first means incorporated in said DTE for coupling specified digital input and output signals through a first terminal set of said first mounted connector as first standardized transmission and reception signals, said first coupling means being configured to support signals through at least three different signal standards, including said second signals, without switches; and a multiple conductor cable having a first termination for connecting to said first mounted connector and a second termination for connecting to said second mounted connector, said first termination having conduit position assignments to said first terminal set which match said first terminal set to one of at least three different configurations of said second terminal set of standardized transmission and reception signals.

2. An apparatus according to claim 1 wherein said first coupling means includes means for coupling said output digital signals to (a) first selected terminals of said first terminal set according to a first position assignment through unbalanced generators and to (b) second selected terminals of said first terminal set according to a second position assignment through balanced generators.

3. An apparatus according to claim 2 wherein said first coupling means includes means for coupling said input digital signals from third and fourth selected terminals of said first terminal set according to third and fourth position assignments through balanced receivers, one of each pair of inputs to said balanced receivers coming from respective third and fourth selected terminals.

4. An apparatus according to claim 3 wherein said first termination of said cable includes means for grounding said fourth selected terminals of said fourth position assignment in order to transform said balanced receivers into unbalanced receivers upon connection of said cable between said first connector and said second connector.

5. An apparatus according to claim 1 or 4 wherein said multiple conductor cable further includes a third termination, said third termination having conduit position assignments with a one-for-one correspondence with conduit position assignments of said second termination, said first termination being specifically adapted to couple only to said first electrical connector of said DTE, said second termination being adapted to couple only to a multiple terminal connector of a type as second multiple terminal connector of said DCE such that interconnections can be made from more than one DTE through a single connector to a single DCE.

6. The apparatus according to claim 4 wherein said second standardized transmission and reception signals and the position assignment of said second selected terminal set is according to EIA Standard RS-232C.

7. An apparatus according to claim 4 wherein said second standardized transmission and reception signals and the pin assignments of said second selected terminal set are according to EIA Standards RS-449/422 37-position interface with the following unassigned pin assignments of said second terminal at: 2, 3, 10, 11, 13, 14, 15, 16, 18, 21, 28, 29, 31, 32, 33, 34, 36.

8. An apparatus according to claim 7 having the following further unassigned pin assignments of said second selected terminal set: 12, 19, 20, 30, 37.

9. An apparatus according to claim 4 wherein said first selected terminal set has pin assignments having one-for-one correspondence with pin assignments according to EIA Standard RS-232C and with at least the following unassigned pin assignments: 10, 11, 12, 13, 19, 21, 24, 25.

10. An apparatus according to claim 9 wherein the following positions of said first terminal set are coupled to signal ground through said cable: 6, 14, 16, 18, 23.

11. An apparatus according to claim 10 wherein pin 6 of said second terminal set is adapted to be coupled through said cable to pin 19 of said first terminal set, said pin 19 of said first terminal set being specified for a Data Set Ready signal.

12. The apparatus according to claim 1 wherein conduit position assignments of said first termination are identical to conduit assignments of said second termination and a third termination, and wherein said second coupling means comprise balanced generators and receivers.

13. An apparatus according to claim 12 wherein said multiple conductor cable further has a third termination, said third termination having conduit position assignments with a one-for-one correspondence with conduit position assignments of said second termination, said first termination being specifically adapted to couple only to said first electrical connector of said data terminal equipment, said second termination being adapted to couple only to said second multiple terminal connector to said data communication equipment or to a cable having a multiple terminal connector of the same configuration as said second DCE mounted connector such that multiple-point interconnections can be made through a single connector to a single data communication equipment.

* * * * *